(No Model.)
J. G. POWELL.
CHAIN.
No. 324,587. Patented Aug. 18, 1885.
FIG. 1.
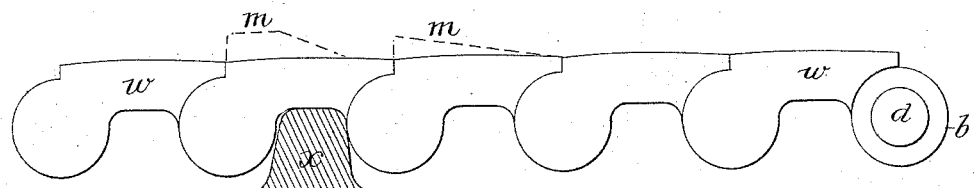
FIG. 2.
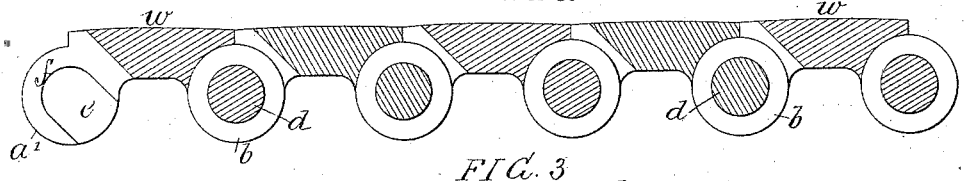
FIG. 3.
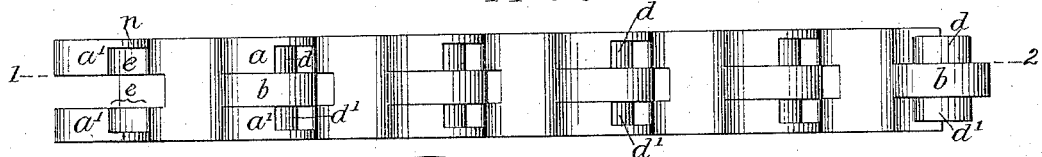
FIG. 8.   FIG. 5.   FIG. 4.
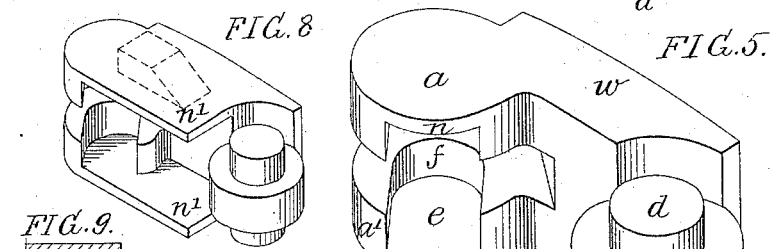
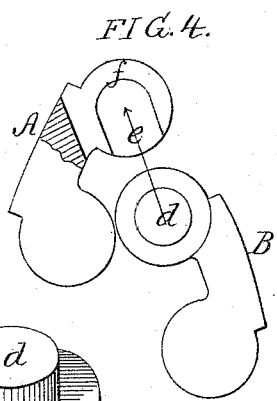
FIG. 9.   FIG. 6.   FIG. 7.
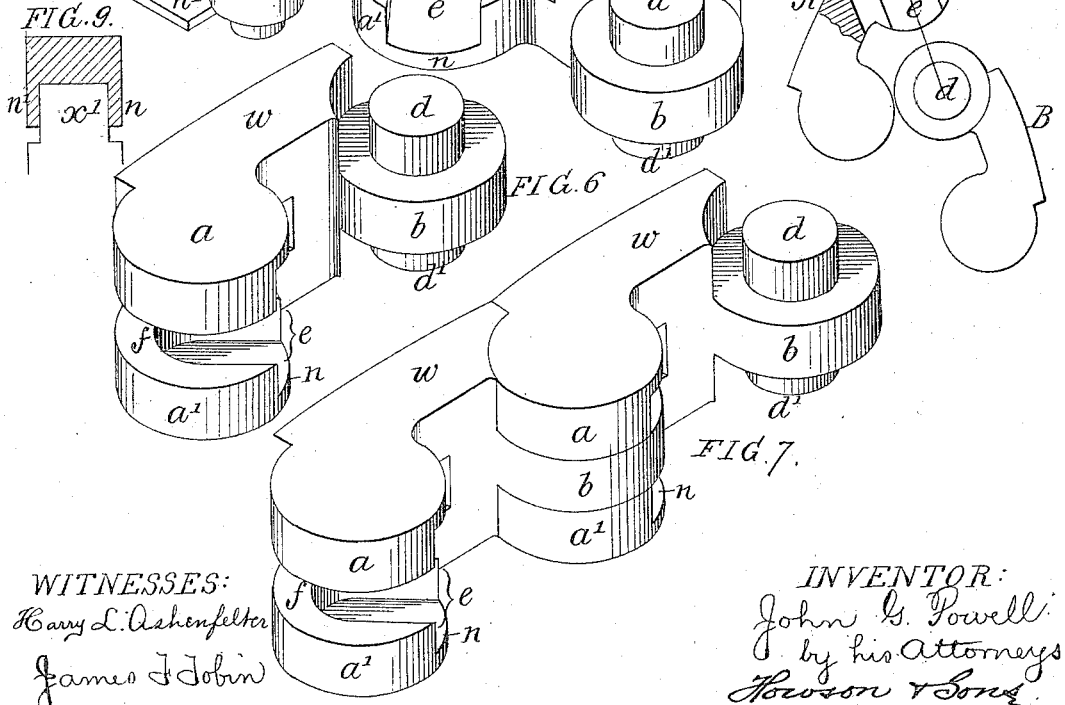
WITNESSES:
Harry L. Ashenfelter
James J. Tobin
INVENTOR:
John G. Powell
by his Attorneys
Howson & Sons
N. PETERS. Photo-Lithographer, Washington, D. C.

UNITED STATES PATENT OFFICE.

JOHN G. POWELL, OF PHILADELPHIA, PENNSYLVANIA, ASSIGNOR TO HIMSELF AND EDWARD POWELL, OF SAME PLACE.

CHAIN.

SPECIFICATION forming part of Letters Patent No. 324,587, dated August 18, 1885.

Application filed September 15, 1883. (No model.)

*To all whom it may concern:*

Be it known that I, JOHN G. POWELL, a citizen of the United States, and a resident of Philadelphia, Pennsylvania, have invented an Improvement in Chains, of which the following is a specification.

My invention consists of a chain composed of a series of connected mold-finished white-metal links, fitted to each other in the manner explained hereinafter, the object of my invention being to produce a cheap pattern-chain of accurately-fitting links, the bearing-surfaces of which are durable, owing to the fact that the surfaces subjected to friction have the smooth hard skin due to the mold in which the links are cast.

In the accompanying drawings, Figure 1 is a side view of the chain; Fig. 2, a longitudinal section; Fig. 3, an inverted plan view of Fig. 1; Fig. 4, a view showing the mode of connecting the links together; Figs. 5, 6, and 7, perspective views, drawn to an enlarged scale and in different positions; and Figs. 8 and 9 modifications of the link.

The detailed construction of the link can be best explained by reference to the enlarged perspective views, Figs. 5, 6, and 7. The body $w$ of each link has at one end two circular projections, $a\ a'$, and at the opposite end has a disk-like projection, $b$, from opposite sides of which project the pivot-pins $d\ d'$. The distance between the two circular projections $a\ a'$ of one link is such that the disk-like projection $b$ of another link will fit snugly, but so as to vibrate freely, between the said projections.

In each inner face of each of the projections $a\ a'$ is an inclined recess, $e$, having opposite parallel sides and a semicircular termination, $f$, which is concentric with the periphery of the projection, the recesses $e$ of the two projections $a\ a'$ being of such a width between the opposite parallel sides as to admit the pins $d\ d'$ of one of the links, and the semicircular ends $f$ of the recesses form snug bearings for the said pins. In connecting two of these links together they are first held in the position shown in Fig. 4 in relation to each other; then by moving the link B in the direction of its arrow, the two pivot-pins will traverse the inclined recesses $e$ of the other link until they reach the semicircular ends $f$ of the same, after which, if the outer ends of the two links be moved apart, the pivot of one turning in the pivot-bearing of the other, the two links will be connected together, and they cannot be disconnected until they are again brought to the relative positions shown in Fig. 4.

The manner in which the links of the chain fit to each other, in respects other than those described, is too clearly illustrated in the drawings to need explanation. It should be here stated that these links have been mainly intended for endless pattern-chains for fancy looms and knitting-machines, and it will be seen, on referring to Fig. 1, that I have shown, by dotted lines on two of the links cam-like projections $m\ m$, which may be similar to those of ordinary pattern-chains.

The prominent distinguishing characteristics of the chain are as follows: First, the links are composed of an alloy, which will melt at such a temperature that they can be cast in iron or steel molds, the alloy being known by the generic name of "white metal," which includes Babbitt metal and other alloys; second, the links, on leaving the mold, require no finishing in order to insure that accurate fitting of the projection of one link between the projections on the next which a pattern-chain demands; third, the parts of the chain which are subjected to the greatest friction—that is, those faces of the projections of the links which have to vibrate in contact with each other—have hard smooth skins, due to the metal molds in which the links are cast, and this skin, owing to its uniformity, smoothness, and hardness, is especially adapted to resist the wearing influences of friction.

When very durable joints are required, I make the pins $d\ d'$ of steel or of a good quality of wrought-iron, a short piece of round steel or iron being introduced into the mold before the link is cast, so as to form the two pins.

There is a peculiarity in the link which adds much to its strength, for if the recesses $e$ extended entirely through the circular projections $a\ a'$ the latter would be much weakened; but by limiting the depth of the said recesses there is left a strengthening-web, $n$.

In Fig. 1 I have shown one of the teeth $x$ of a sprocket-wheel adapted to the chain, the wheel being so flanged as to retain the chain laterally; but in some cases I propose to cast cam-like projections on the sides of the link, as shown in Fig. 8, in which case I continue the webs $n$, above referred to, so as to form on each link two flanges, $n'$, between which extend the teeth $x'$ of a flangeless wheel, as shown in Fig. 9.

I claim as my invention—

1. A chain-link, consisting of a bar or body portion having at one end projections $a\ a'$, with recesses $e$, and at the other end a projection, $b$, with pins $d\ d'$, said projections, pins, and recesses having a hard smooth skin, as set forth.

2. A chain composed of links, each consisting of a bar or body portion having at one end projections $a\ a'$, with recesses $e$, and at the other end a projection, $b$, with pins $d\ d'$, adapted to the recesses $e$ of an adjoining link, said projections, pins, and recesses having a hard smooth skin, as set forth.

In testimony whereof I have signed my name to this specification in the presence of two subscribing witnesses.

JOHN G. POWELL.

Witnesses:
HARRY L. ASHENFELTER,
HARRY SMITH.